Oct. 10 1967  J. H. WEAVER  3,345,733
NUCLEAR REACTOR FUEL ELEMENTS
Filed Oct. 23, 1964  2 Sheets-Sheet 1
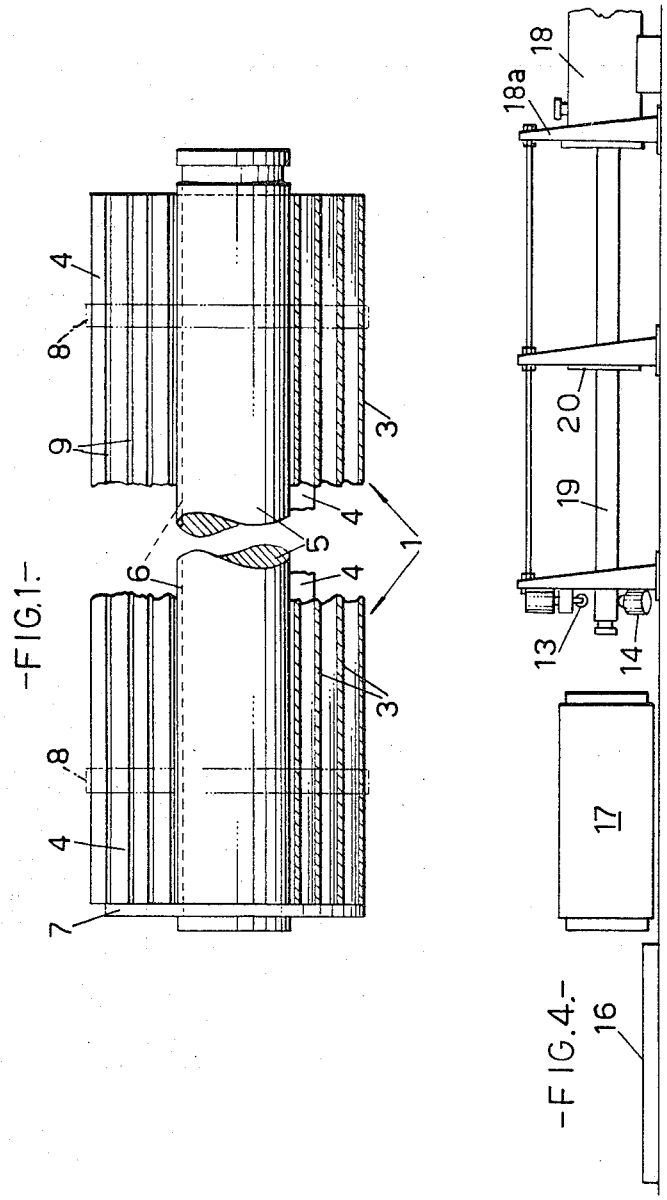

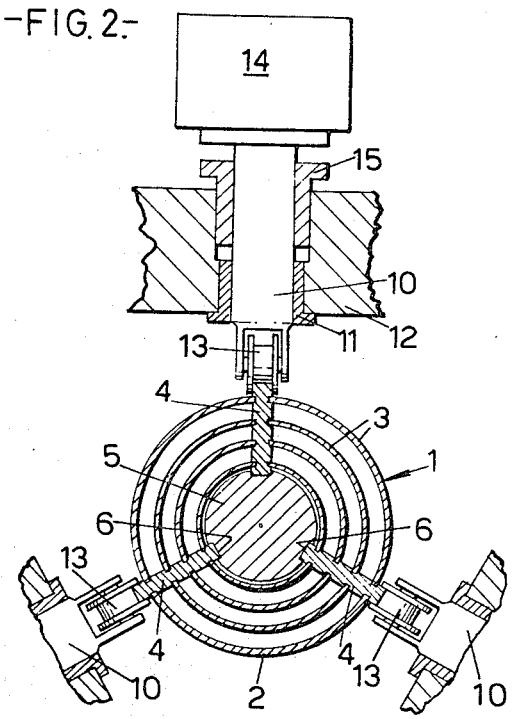
FIG. 2.-
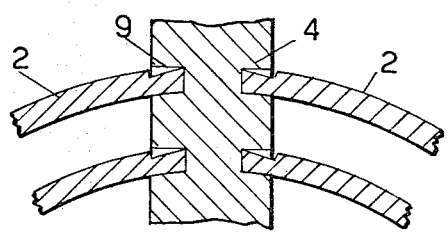
FIG. 3.-

United States Patent Office 3,345,733
Patented Oct. 10, 1967

3,345,733
NUCLEAR REACTOR FUEL ELEMENTS
John Harold Weaver, Warrington, England, assignor to United Kingdom Atomic Energy Authority, London, England
Filed Oct. 23, 1964, Ser. No. 406,083
Claims priority, application Great Britain, Nov. 7, 1963, 44,061/63
6 Claims. (Cl. 29—455)

This invention relates to nuclear reactor fuel elements of the type comprising assemblies of plates bearing fissile material.

Fuel elements comprising assemblies of fuel plates are commonly used in Materials Testing and Engineering Testing Reactors and there are two main types, firstly those in which the plates are in spaced parallel array and are supported at their edges by fuel element side plates to form a boxlike structure, and, secondly, those in which the plates are curved and are supported at their edges by radial members to define a series of spaced coaxial tubes.

A common method of rigidly securing the fuel plates to the side plates or radial members is by a dip brazing technique which is complex and is not readily adaptable to quantity production of fuel elements. Other methods have been proposed (some of which have been used) which provide alternatives to brazing and which are particularly suitable for securing the fuel plates of the box type fuel elements. For example, British patent specification No. 858,624 discloses the securing of the longitudinal edges of fuel plates in grooves in the side plates by demountable mechanical coupling means such as by pinning and also by the deformation of tabs (formed integrally with the fuel plates) which penetrate apertures in the side plates, and United States patent specification No. 3,074,299 discloses securing the fuel plates in grooves in the side plates by drawing a tool through a fuel plate assembly between adjacent plates, the tool having sharp-edged wheels which deform the material adjoining the grooves of the side plates to grip the edges of the fuel plates and form a non-demountable coupling. Yet another method of securing the fuel plates is disclosed in Report No. TID 7559 (Part I) which is a report of the Proceedings of the Fuel Element Conference held in Gatlinburg in May 1958, the method comprising providing dovetail shaped edges on the fuel plates, mounting the plates with the edges supported in parallel sided grooves in the side plates and loading the edges of the plates to close up the grooves to grip the edges of the fuel plates. The technique is carried out with the assembly mounted in a jig having massive supports for the side plates during the loading operation.

According to the present invention a method of constructing a nuclear reactor fuel element of the type comprising a plurality of part annular plates bearing fissile material and supported at their longitudinal edges by radial support members so as to define a series of spaced coaxial tubes, comprises assembling the fuel plates with their longitudinal edges loosely supported in grooves in the radial support members, mounting the assembly on a mandrel, and passing the assembly between radially disposed deforming members whereby radially inward pressure is exerted on the edges of the radial support members so as to close up the grooves by deforming material of the radial support members so that the groove walls grip the edges of the fuel plates.

Preferably the edges of the fuel plates are prepared by dovetailing in the manner taught by the aforesaid Report No. TID 7559 (Part I) and can be dovetailed one or both sides of each longitudinal edge of the fuel plates.

The deforming members can comprise rollers which are urged towards the axis of the assembly to apply the deforming load to the edges of the radial support members.

The mandrel-mounted fuel assembly can be pre-heated to increase the ductility of the material of the radial support members.

Apparatus for constructing fuel elements according to the invention comprises heating means, deforming members, mandrel stripping means and ram means arranged so that a mandrel mounted fuel assembly can be, successively, pre-heated in passage through the heating means, attached to the ram means, drawn between the deforming members, and stripped from the mandrel.

By way of example, a fuel plate assembly and its construction by a method and apparatus according to the invention will now be described with reference to the accompanying drawings wherein:

FIGURE 1 is a fragmentary sectional side view of a mandrel mounted fuel plate assembly, FIGURE 2 is a cross-sectional view of a mandrel mounted fuel plate assembly in passage through deforming means, FIGURE 3 is a sectional detail to show the pre-deforming coupling of fuel plate edges with radial support members, and FIGURE 4 is a side view of apparatus for constructing fuel plate assemblies.

Referring to FIGURES 1 and 2, there is illustrated a fuel plate assembly 1 comprising twelve fissile-material-bearing plates 2 (which for example each consist of a sheet of uranium/aluminium alloy, the uranium being enriched in the isotope $U_{235}$, and clad in aluminium) which are bowed transversely and arranged in three groups of four to define four coaxial tubes 3.

The longitudinal edges of the plates are supported by radial support members 4 (for example of aluminum) and the assembly is shown mounted on a mandrel 5 having three longitudinal grooves 6 which locate the inner longitudinal edges of the support members 4. A draw plate 7 secured to one end of the mandrel abuts the end of the fuel plate assembly and retaining bands 8 embrace the assembly to hold it rigid during subsequent operations. The support members 4 have parallel sided longitudinal grooves 9 for loosely engaging the edges of the plates 2 and, as shown in the detail in FIGURE 3, the longitudinal edges of the plates are dovetailed, for example by rolling, prior to insertion in the grooves 9.

Referring to FIGURE 2, three plungers 10 are radially disposed with respect to the longitudinal axis of the fuel plate assembly and are carried in bushes 11 housed in brackets 12 only parts of which are shown. The plungers 10 carry flanged rollers 13 at their inner ends which bear against the outer edges of the radial support members 4. Each of the plungers 10 can be urged radially inwardly by a hydraulic ram 14, the extent of its inward travel being limited by an adjustable stop nut 15.

In use the fuel plate assembly 1 mounted on the mandrel 5 is drawn between the rollers 13, load being applied thereto by the hydraulic rams 14 sufficient to close up, by deforming, the grooves 9 in the support members 4 and grip the dovetailed longitudinal edges of the fuel plates. Three radial fingers (not shown) directed towards the axis of the ram precede the rollers and serve to push the retaining bands 8 from the assembly during the deforming action.

Referring now to FIGURE 4, an assembly table 16 and an electric furnace 17 are both disposed on the axis of a double acting hydraulic ram 18. The ram is spanned by a framework 18a carrying rollers 13 and rams 14 at the end adjoining the furnace. The ram 18 has sufficient stroke and its plunger 19 sufficient length to enable the free end of the plunger to extend to the exit of the furnace 17 (the right hand end thereof as shown in FIGURE 4). A plate 20 attached to the framework 18a is penetrated by the plunger 19 through an aperture which is sufficiently large to allow free passage of the plunger and mandrel but not to allow free passage of the fuel plate assembly.

In operation, the fuel plate assembly is assembled and mounted on the mandrel 5 on the table 16, the combination is then passed by suitable means, for example a conveyor belt (not shown), through the furnace 17 in which the temperature of the fuel plate assembly is raised to approximately 300° C. At the exit from the furnace the mandrel 5 is attached to the plunger 19 which is then withdrawn to draw the fuel plate assembly through the rollers 13. Further withdrawal of the plunger 19 after completion of the deforming operation brings the fuel plate assembly into abutment with the plate 20 so that, after manual removal of the draw plate 7, continued withdrawal of the plunger 19 serves to strip the fuel plate assembly from the mandrel 5.

The apparatus can be adapted for the construction of coaxial tubular fuel plate assemblies having more than three radial support members by suitable disposition of an equivalent number of rollers 13 and rams 14, and of course assemblies comprising less or more than four coaxial tubes can be so treated.

It is envisaged that fuel plates can be secured to the side plates of box-like fuel elements using similar roll deforming apparatus, and wherein the fuel plate assembly, supported by massive side support members, is drawn through the deforming rollers.

An advantage resides in the fact that all the fuel plates of an assembly are secured by one pass through the deforming rollers.

I claim:

1. A method of constructing a nuclear reactor fuel element of the type comprising a plurality of part annular plates bearing fissile material and supported at their longitudinal edges by radial support members so as to define a series of spaced coaxial tubes, said method comprising the steps of assembling the fuel plates with their longitudinal edges loosely supported in grooves in the radial support members, mounting the assembly on a mandrel, and passing the assembly between radially disposed deforming members whereby radially inward pressure is exerted on the edges of the radial support members so as to close up the grooves by deforming material of the radial support members so that the groove walls grip the edges of the fuel plates.

2. A method according to claim 1, including as an initial step the preparation of at least one of the two sides of each longitudinal edge of the part annular plates by dovetailing.

3. A method according to claim 2, including the step of pre-heating the mandrel-mounted fuel assembly to increase the ductility of the material of the support members before passing the assembly between the radially disposed deforming members.

4. A method according to claim 1, including the step of pre-heating the mandrel-mounted fuel assembly to increase the ductility of the material of the support members before passing the assembly between the radially disposed deforming members.

5. Apparatus for constructing fuel elements according to claim 4, comprising heating means, deforming members, mandrel stripping means and ram means arranged so that a mandrel mounted fuel assembly can be, successively, pre-heated in passage through the heating means, attached to the ram means, drawn between the deforming members, and stripped from the mandrel.

6. Apparatus according to claim 5, wherein the deforming members comprise rollers which are urged towards the axis of the assembly to apply the deforming load to the edges of the radial support members.

References Cited

UNITED STATES PATENTS

| 2,981,673 | 4/1961 | Johnson | 176—75 |
| 3,068,160 | 12/1962 | Erwin | 29—509 X |
| 3,087,878 | 4/1963 | Brand | 29—462 |
| 3,173,843 | 3/1965 | Simpson | 176—83 |

THOMAS H. EAGER, *Primary Examiner.*